United States Patent
Byrn et al.

[19]

[11] Patent Number: 5,502,833
[45] Date of Patent: Mar. 26, 1996

[54] SYSTEM AND METHOD FOR MANAGEMENT OF A PREDICTIVE SPLIT CACHE FOR SUPPORTING FIFO QUEUES

[75] Inventors: Jonathan W. Byrn; Gary S. Delp, both of Rochester, Minn.

[73] Assignee: International Business Machines Corporation, Armonk, N.Y.

[21] Appl. No.: 221,140

[22] Filed: Mar. 30, 1994

[51] Int. Cl.⁶ .......................... G06F 12/00; G06F 13/00
[52] U.S. Cl. .................. 395/459; 395/436; 395/437; 395/600; 395/728; 364/239.8; 364/244.3; 364/246.11; 364/247.7; 364/DIG. 1
[58] Field of Search .................... 395/436, 437, 395/459, 600, 725; 364/238.8, 244.3, 246.11, 247.7

[56] References Cited

U.S. PATENT DOCUMENTS

| | | | |
|---|---|---|---|
| 3,810,117 | 5/1974 | Healey | 395/459 |
| 3,889,243 | 6/1975 | Drimak | 395/459 |
| 4,322,815 | 3/1982 | Broughton | 395/775 |
| 4,437,155 | 3/1984 | Sawyer et al. | 395/463 |
| 4,523,206 | 6/1985 | Sasscer | 395/457 |
| 4,530,049 | 7/1985 | Zee | 395/459 |
| 4,530,054 | 7/1985 | Hamstra et al. | 395/550 |
| 4,530,055 | 7/1985 | Hamstra et al. | 395/463 |
| 4,802,086 | 1/1989 | Gay et al. | 395/460 |
| 4,811,203 | 3/1989 | Hamstra | 395/469 |
| 5,140,690 | 8/1992 | Hata et al. | 395/182.03 |
| 5,155,831 | 10/1992 | Emma et al. | 395/448 |
| 5,379,399 | 1/1995 | Conway-Jones et al. | 395/436 |

FOREIGN PATENT DOCUMENTS 89-314357  12/1993  Japan.

*Primary Examiner*—Tod R. Swann
*Assistant Examiner*—Frank J. Asta
*Attorney, Agent, or Firm*—Andrew J. Dillon

[57] ABSTRACT

A first-in, first-out queue is implemented on two memory elements by enqueuing and dequeuing items from a first memory element and by swapping middle portions of the queue between the first memory element and the second memory whenever the first memory element is sufficiently filled. Where the second element is system memory for a computer system, queue length can be allowed to grow almost arbitrarily while preserving the performance of first memory element.

22 Claims, 7 Drawing Sheets

SYSTEM AND METHOD FOR MANAGEMENT OF A PREDICTIVE SPLIT CACHE FOR SUPPORTING FIFO QUEUES

BACKGROUND OF THE INVENTION

1. Technical Field

The invention relates to data processing systems and more particularly to a data caching scheme for use on data processing systems. The invention relates still more particularly to use of the caching scheme for management of a buffer for a network adaptor receiving and/or transmitting data packets for a node of a distributed data processing system.

2. Description of the Related Art

The passing of data in either direction between a network communications link and a network node is commonly done by buffering the data. Buffering avoids any need for rigid synchronization of the network communications link and the internal operations of the network node. A buffer may be implemented using memory or data storage registers, a disk drive, a delay line, or any one of a number of technologies. Use of a buffer allows for differences in the rate of flow of information or time of occurrence of events when transmitting information between the communications link and node.

The organization of data for transmission over a communications link has a number of consequences relating to efficient use of the communications link, management of transmission and receipt of the data, efficient use of memory upon receipt of the data, among other things. For example, data are commonly organized into packets in which control and data elements are switched and transmitted as a composite whole. The use of packets simplifies a number of issues concerning routing, primarily by allowing simplified referencing for the packets or frames. Some management functions for the packet may then be executed on references associated with the packets, e.g. pointers to storage locations for the packets.

As described in copending patent application Ser. No. 08/171,050, filed on Dec. 21, 1993, titled "System and Method for Management of a Communications Buffer", and assigned to the assignee as the present application, various first-in, first-out (FIFO) lists may be used to support operation of a communications buffer. The referenced application provides for segregating data packets by size class and passing the segregated packets to frames sized to handle all packets of a class. Available frames in a buffer for each class of packets are tracked in FIFO lists of pointers to the frames. Frames may then be passed from their own receive FIFO buffer into frames in an addressable buffer, where a pointer taken from a FIFO list of available pointers indicates the frame used. The pointer is in turn placed in a receive queue, or for outbound data, a transmit queue, both of which may be implemented in FIFO lists.

As network data transmission rates increase the number of packets requiring buffering at any given time tends to increase. In the above example, this requires larger FIFO lists for available pointers and used pointers. When constructing a very large scale integration (VLSI) chip set to support FIFO queues and queuing logic, it is difficult to achieve simultaneously, both low latency times and large queue sizes. Large queues point to lengthened response times or to the use of expensive high speed memory devices. This phenomenon particularly exhibits itself when the memory capacity required to implement the queues exceeds on-chip capacity, as occurs frequently in multimedia applications with concurrent time-dependent audio/video streams and consequent demands for large queues. Increasing on chip memory capacity though may be prohibitively expensive, while limiting queue length may be untenable.

In a software implementation this problem manifests itself when queuing data is flushed from the processor cache, or a virtual storage page is swapped to a backing store. A very large processor cache might be required or the memory for the queue might be pinned to main storage to avoid a page fault. Either solution depends on probabilistic access times to be the best case all of the time, which is unlikely to occur.

SUMMARY OF THE INVENTION

It is an object of the present invention to provide a system and method for the management of a predictive split cache for supporting FIFO queues.

It is another object of the present invention to provide for FIFO queues of arbitrary length on a processor cache without expanding processor cache size.

It is another object of the present invention to provide for segmenting a FIFO queue if required by length of the queue between two memory elements.

These and other objects of the invention are provided for by a system for caching items for first-in, first-out queues on a data processing system. The system comprises a backing store for supporting a wrap around buffer and a cache store having a plurality of frames for receiving inputs to the queue and supplying items to be dequeued. A cache pointers controller provides for dynamically assigning some but not all of the plurality of frames to a cache tail portion and remaining frames of the plurality of frames to a cache head portion. An enqueue controller is responsive to an enqueue command for writing an item to a free frame assigned to the cache tail portion. A dequeue controller is responsive to a dequeue command for reading an item from an occupied frame assigned to the cache head portion. A secondary storage controller moves items in frames assigned to the cache tail portion to a trailing location in the wrap around buffer whenever too many items are in the cache. The secondary storage controller further provides for moving an item from a leading location in the wrap around buffer to an unoccupied frame in the cache head portion whenever a space appears therein. When the wrap around buffer is empty, items may be moved from the cache tail portion to the cache head portion directly by the cache pointers controller through a cache pointer manipulation and not by a data move.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
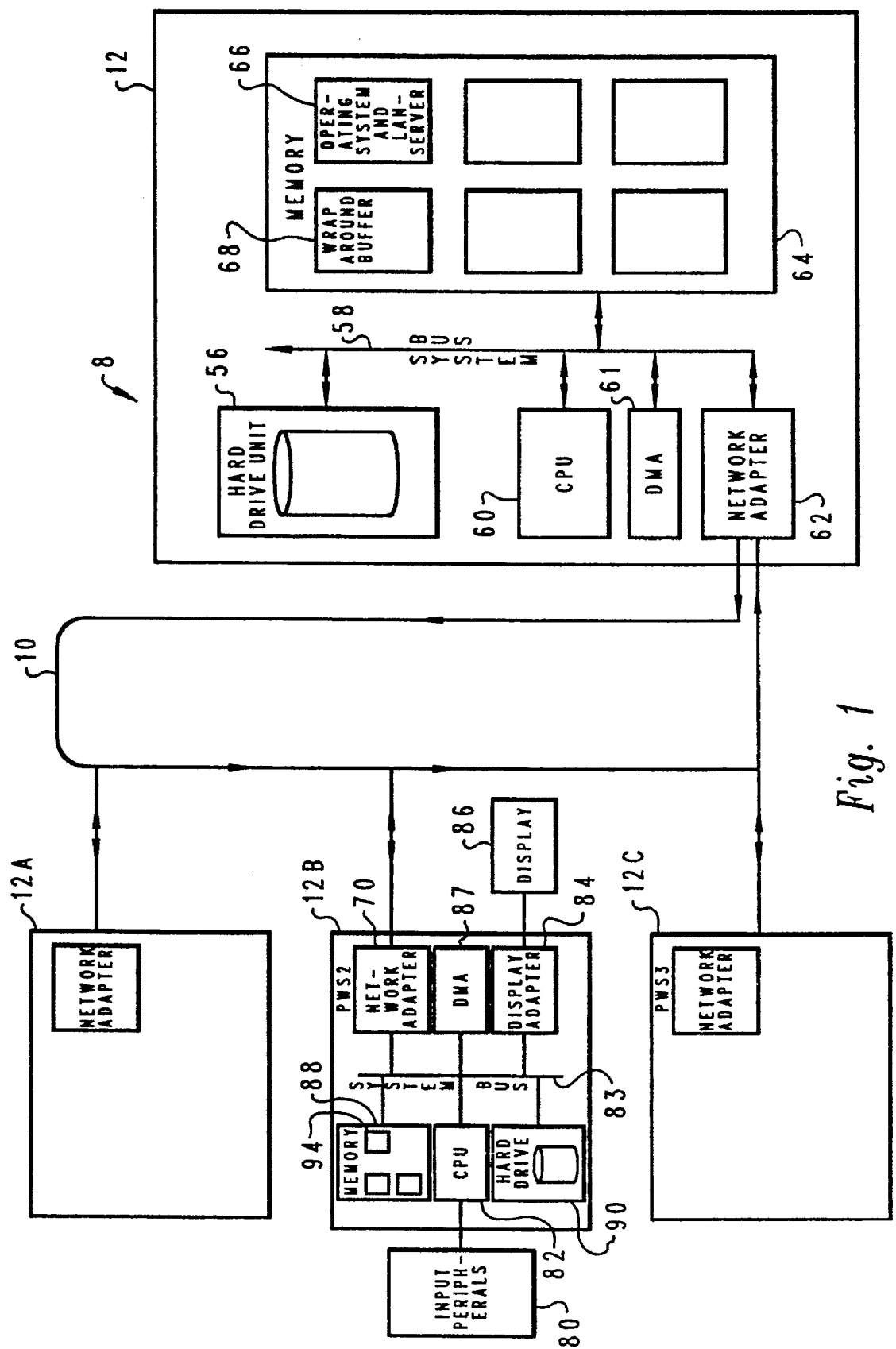
FIG. 1 is a block diagram of a token ring network interconnecting a plurality of nodes.

FIG. 1 depicts a block diagram of an illustrative local area network for supporting transmittal of data. Network 8 provides for the transmittal of file server and multimedia data between a plurality of nodes including file server 12 and computers 12A, 12B and 12C. The example is illustrative only and other types of nodes are permitted. Local area network 8 is depicted in a token ring geometry, however other geometries are possible. Server 12 communicates with computers 12A–12C over a communications channel 10. Server 12 is a conventional computer such as an IBM Personal System/2 or AS/400 system and includes a central processing unit 60, a memory 64, and a network adapter 62 for buffering outgoing and incoming transmissions of data frames or packets. Server 12 includes a hard drive unit 56 storing a plurality of multimedia and other data objects pending a request for access by one or more users. Such a request results in staging of the data object from hard drive unit 56 to computer memory 64 or network adaptor 62 over system bus 58. A number of objects exist within memory 64. An operating system and local area network server 66 are represented as one object. One or more wrap around buffers 68, which may be in dedicated memory and/or may be stored in main memory 64, are accessible from network adaptor 62 to support FIFO queues uses for managing buffering of data packets received over channel 10 or for transmission over channel 10. Objects stored on hard drive unit 56 and memory 64 to be transmitted must be organized into frames or packets and handed off to network adaptor 62. Similarly, data being received over ring 10 may be staged from network adaptor 62 for transfer to hard drive unit 56 or memory 64. CPU 60 can program a direct memory access (DMA) controller 61 to handle transfer of data over system bus 58 to and from network adaptor 62.

Users access data files stored on server 12 through computers 12A–12C. Computer 12B is a typical example. A computer 12B operates as a personal workstation communicating with computer 12. Schematically the personal workstation 12B is substantially similar to server 12, and includes a network adapter 78, a display adapter 84, a hard drive unit 90, a central processing unit (CPU) 82 and an addressable memory 88. Components of personal workstation 12B transfer data internally over a system bus 83. CPU 82 directly controls input peripherals 80 which may include a keyboard and a mouse. Display adapter 84 drives a display device 86, upon which data from a file is visually presented. Memory 88 includes a command structure 94 for use in establishing a communications session on network 8. DMA controller 87 fulfills the same function in computer 12B as DMA controller 61 does in server 12.

Figure 2:
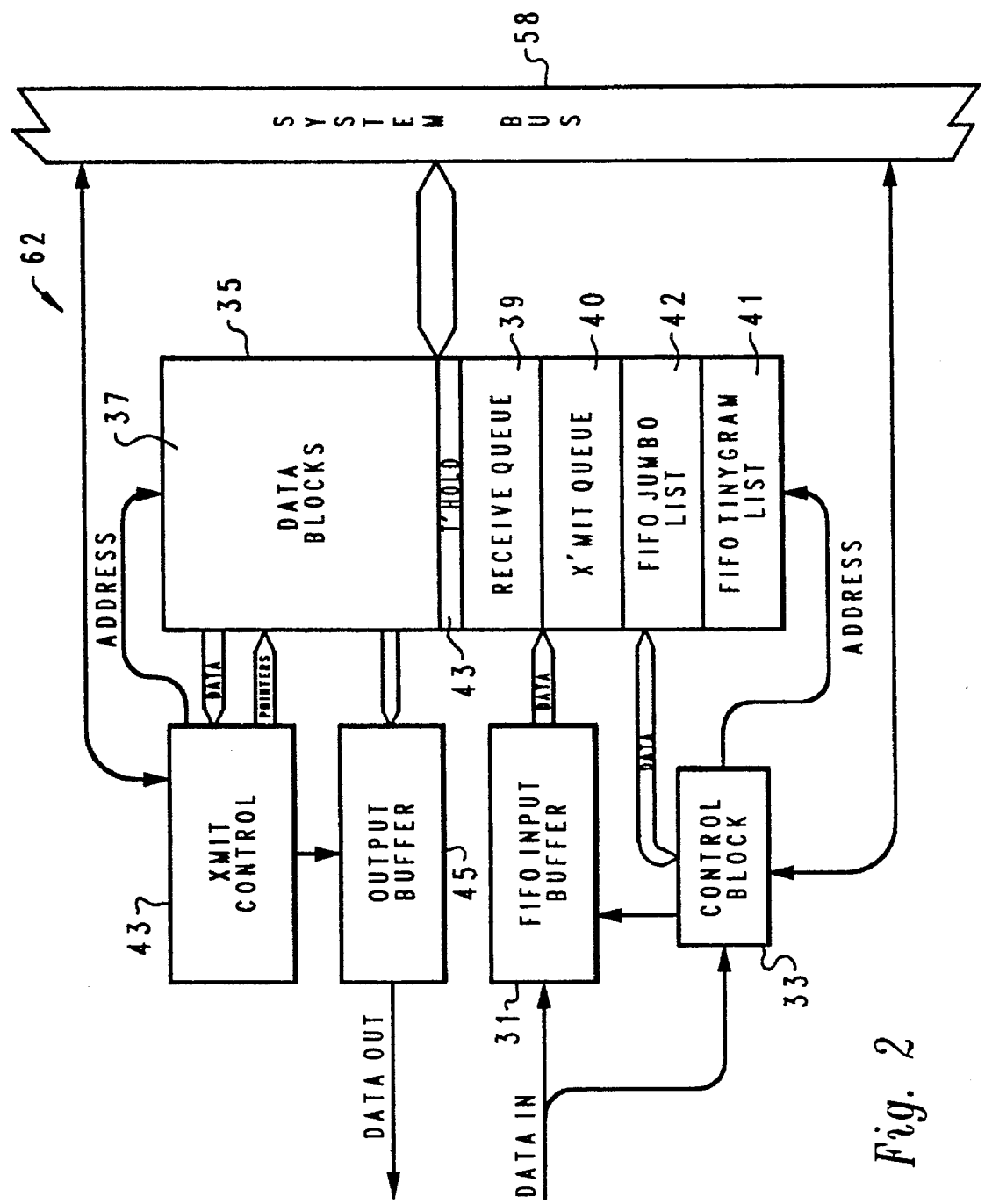
FIG. 2 is a block diagram of data flow within a network adaptor for use on the network of FIG. 1.

FIG. 2 is a block diagram of network adaptor 62. Data frames or packets are received on a First-In, First-Out input buffer 31. Concurrently, packets are provided as an input to control logic block 33, which tracks the size of a packet being received from framing information for the packet. A threshold 43 accessible by control logic block 33 in memory 35 is used for size categorization, i.e. if the packet meets or is bigger than the threshold the packet is deemed a jumbogram, otherwise it is a tinygram. The size category of an incoming packet is known when end of packet information is received or when the threshold is met, whichever comes first. At this point an appropriately sized section of memory 35 may be selected for the packet. Memory 35 is usually an array of Random Access Memory on the adaptor card, but may be part of System Memory 64. Sections of memory 35 are represented by pointers corresponding to addresses. If a section is available, its pointer will be in FIFO jumbogram list 42 or FIFO tinygram list 41, which are at least partly stored in memory 35.

Memory 35 includes a reserved area of data blocks 37 for receiving incoming packets. Data blocks 37 come in two sizes, one sized to take any packet smaller than the threshold and a second sized to take the largest expected size of packet. The threshold 43 is programmable and may be changed. Tinygram pointer list 41 and jumbogram pointer list 42 include pointers to all of the smaller and larger size of blocks available for receiving data, respectively. Upon retrieving a pointer and completion of reception of the packet, control logic block 33 addresses memory device 35 using the pointer (and associated addresses) and enables FIFO input buffer 31 to write the packet to the locations associated with the pointer into memory device 35. The pointer is then placed into receive queue 39. The CPU for the node may then be interrupted or some other technique employed to advise an application that data has been received. After the data packet is released from memory device 35 the pointer is returned to the appropriate list, either tinygram pointer list 41 or jumbogram pointer list 42.

The transmission of data packets may also utilize the division of memory device 35 into jumbograms and tinygrams. In such a case a system CPU may obtain a pointer from lists 41 or 42 and supply the pointer to transmit control 43 through a transmit queue 40. After obtaining the pointer transmit control 43 asserts the pointer (and/or associated addresses) as an address to memory device 35 to write the contents of the associated locations into an output buffer 45 for transmission. The pointer is then returned to the appropriate list 41 or 42. Release of the pointer may be delayed until acknowledgement of successful reception is received from the destination node.

Figure 3:
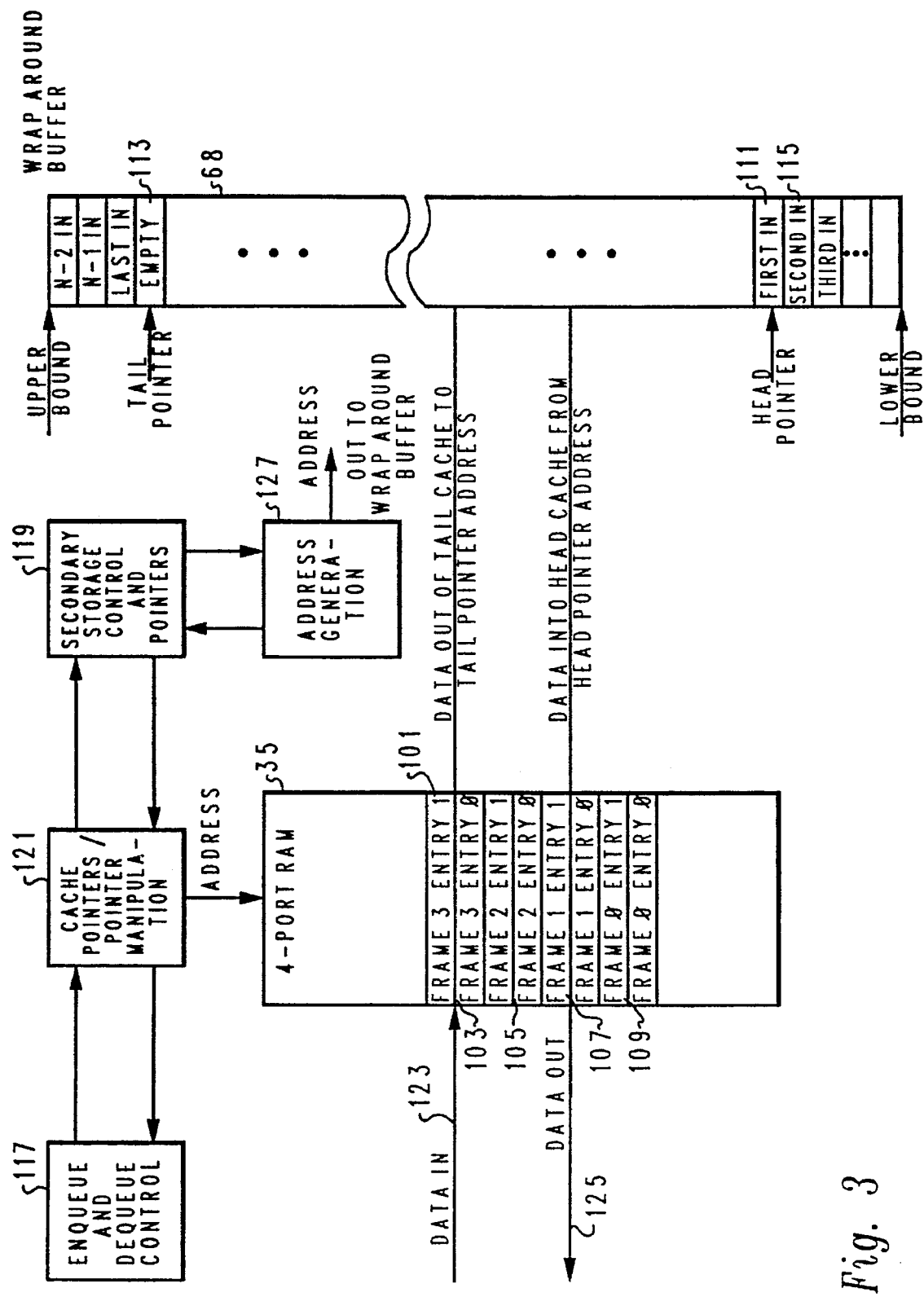
FIG. 3 is a data flow diagram illustrating the split cache technique for maintaining FIFO queues taught by the present invention.

FIG. 3 illustrates the data flow for swapping of entries between a FIFO queue portion 101 from a fast memory device 35, which may implemented in a 4-port random access memory (RAM) serving as a processor cache, and a wrap around storage buffer 68 in main memory 64. Swapping is predicated on the perfect predictability in the order of access to entries in a FIFO queue and can occur whenever the queue is not in use. The next item in a FIFO queue to be accessed is always the oldest item in the FIFO queue. Therefore the oldest item should be brought in the fastest memory. FIFO queue portion 101 has four frames 103, 105, 107, and 109, with each frame having two entries. Frames 103, 105, 107, and 109 are, at various times, assigned to either a tail cache portion or a head cache portion of FIFO queue portion 101, although neither designation is ever permanent. When the number of entries required for FIFO queue portion 101 exceeds the number of frames allocated to the queue in memory device 35, the middle entries of the queue are swapped out to wrap around buffer 68. A Tail Pointer into buffer 68 identifies an empty location to receive the next frame swapped out of the tail portion of the cache in memory device 35. A head pointer identifies a location containing a frame of data which will be the next swapped back into memory device 35. Each time a frame is swapped into buffer 68 the tail pointer is reset to the next adjacent location (or back to the first location adjacent the upper bound of buffer 68 if the empty location had been adjacent the lower bound. When the frame stored in location 111 is read back into memory 35, the head pointer is similarly reset to the next adjacent location, here location 115, or to the first location in buffer 68 adjacent to the upper bound.

Memory device 35 is termed a cache in the sense that it is small, expensive and very high in speed relative to the RAM in which buffer 68 is implemented. It is not to be inferred that selected contents of the wrap around buffer 68 must be duplicated in memory 35 as is conventional in hierarchial memory, although that is not prohibited.

The ongoing redesignation of frames 103, 105, 107, and 109 between tail cache portion and head cache portion implements the passage of data from the entry point (tail) to the exit point (head) of the FIFO queue. Unless the cache is split and data are moved into wrap around buffer 68 data remain in the same frame of FIFO queue portion 101. Buffer 68 is typically located in main memory DRAM which is cheap and virtually inexhaustible in size in comparison to memory device 35.

The redesignation of frames 103, 105, 107, and 109 and the swapping of data in from or out to buffer 68 is carried out by enqueue and dequeue controller 117 and secondary storage controller 119. An enqueue occurs, for example, upon a pointer being returned to an available pointer FIFO queue. An enqueue is equivalent to a write. The pointer is received over data input 123 on memory device 35. Enqueue and dequeue controller 117 passes indication of incoming data to cache pointer/pointer manipulation unit 121 which outputs the address for the current tail frame pointer (CTP) and the Tail Intra Frame Pointer (TIP) for FIFO queue 101 to memory device 35, provided that the current entry in the location corresponding to the CTP and the TIP has been invalidated. The management process has as an air keeping the frame indicated by the CTP in the tail cache portion of queue 101 open.

For dequeue operations, controller 117 provides indication to cache pointers/pointer manipulation unit 121 that data is to be placed on output line 125 from the current head frame of memory device 35. Provided valid data is located in the location indicated by the current head frame pointer (CHP) and the Head Intra Frame Pointer (HIP), they may be passed via output line 125. The management process has as an objective keeping the frame indicated by the CHP in the head cache portion of queue 101 "filled" with valid data.

Several other pointers are maintained by cache pointers/pointer manipulation unit 121, including a next head frame pointer (NHP) and a next tail frame pointer (NTP). The interrelationship of these pointers and the NTP and CHP pointers may be used provide indicators of when to split the cache. For example, when the FIFO queue portion 101 in memory device 35 is full, the CHP and the NTP coincide. Alternatively, assuming a fixed number of frames are assigned to the cache head and cache tail portions respectively, the cache may be split if the cache head portion is filled and any item is in the cache tail portion. The intra frames refer, respectively, to which location within the frame is active. In the case of the TIP it is the next location to store data inside the frame. In the case of the HIP it is the next location to get data from inside the frame. As long as the cache, i.e. FIFO queue portion 101, is unsplit, frames may move between tail cache portion and head cache portion. Once split, membership of frames in one of the two portions is fixed. Pointer manipulation is analogous to an item ageing algorithm.

While the determination to swap entries out to buffer 68 is made by enqueue and dequeue controller 117, actual swapping of items to and from buffer 68 is handled by secondary storage controller 119 in conjunction with an address generator 127 which calculates the current tail and head pointers into buffer 68. Secondary storage control utilizes the current state of the cache, the CTP and the NTP to locate the current frame to be swapped out to buffer 68 and the current state of the cache, the CHP and the NHP to determine the location in memory device 35 to swap data from buffer 68 back into the memory device 35.

Figure 4:
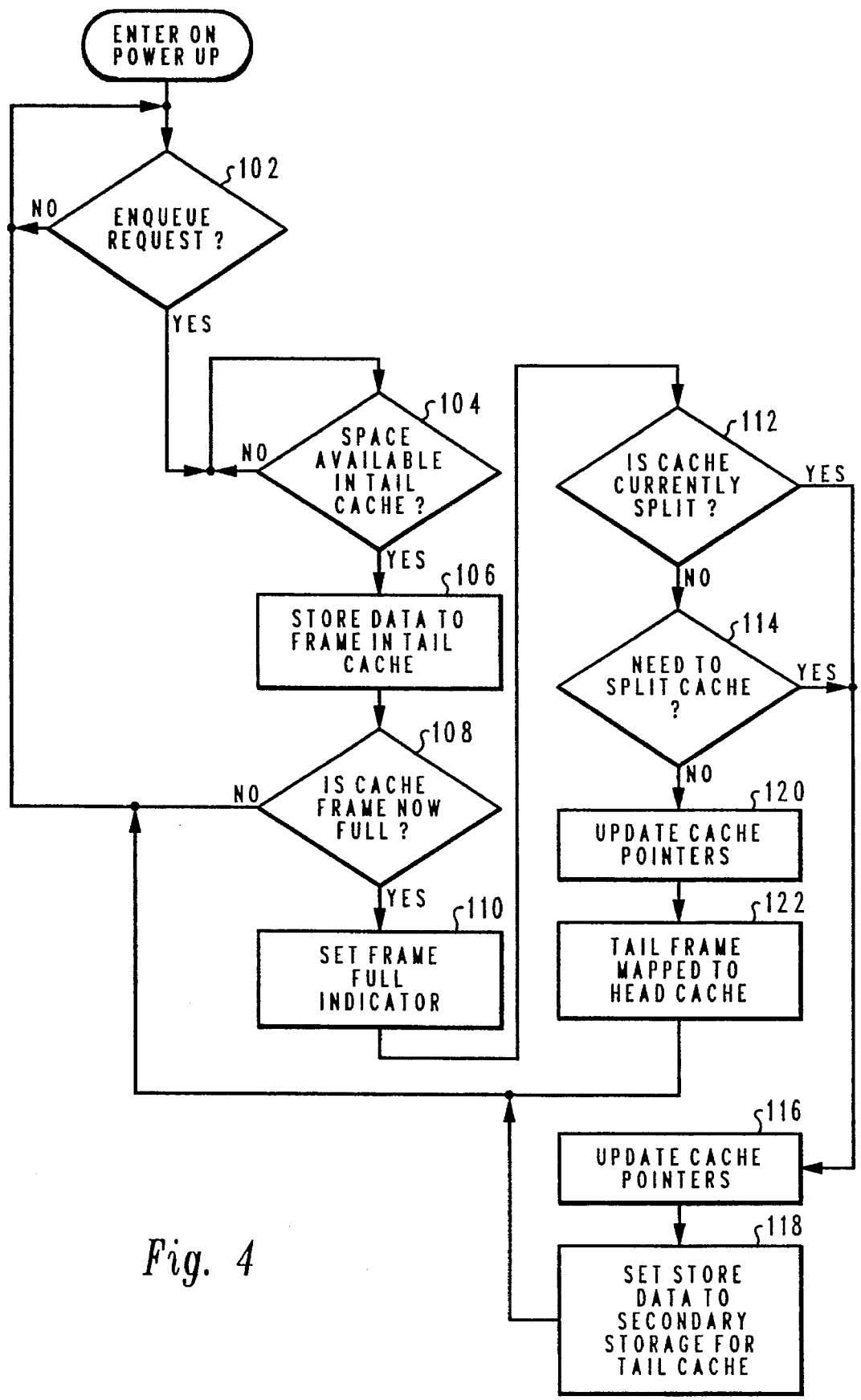
FIG. 4 is a high level logical flow chart of an enqueuing process.
Figure 5:
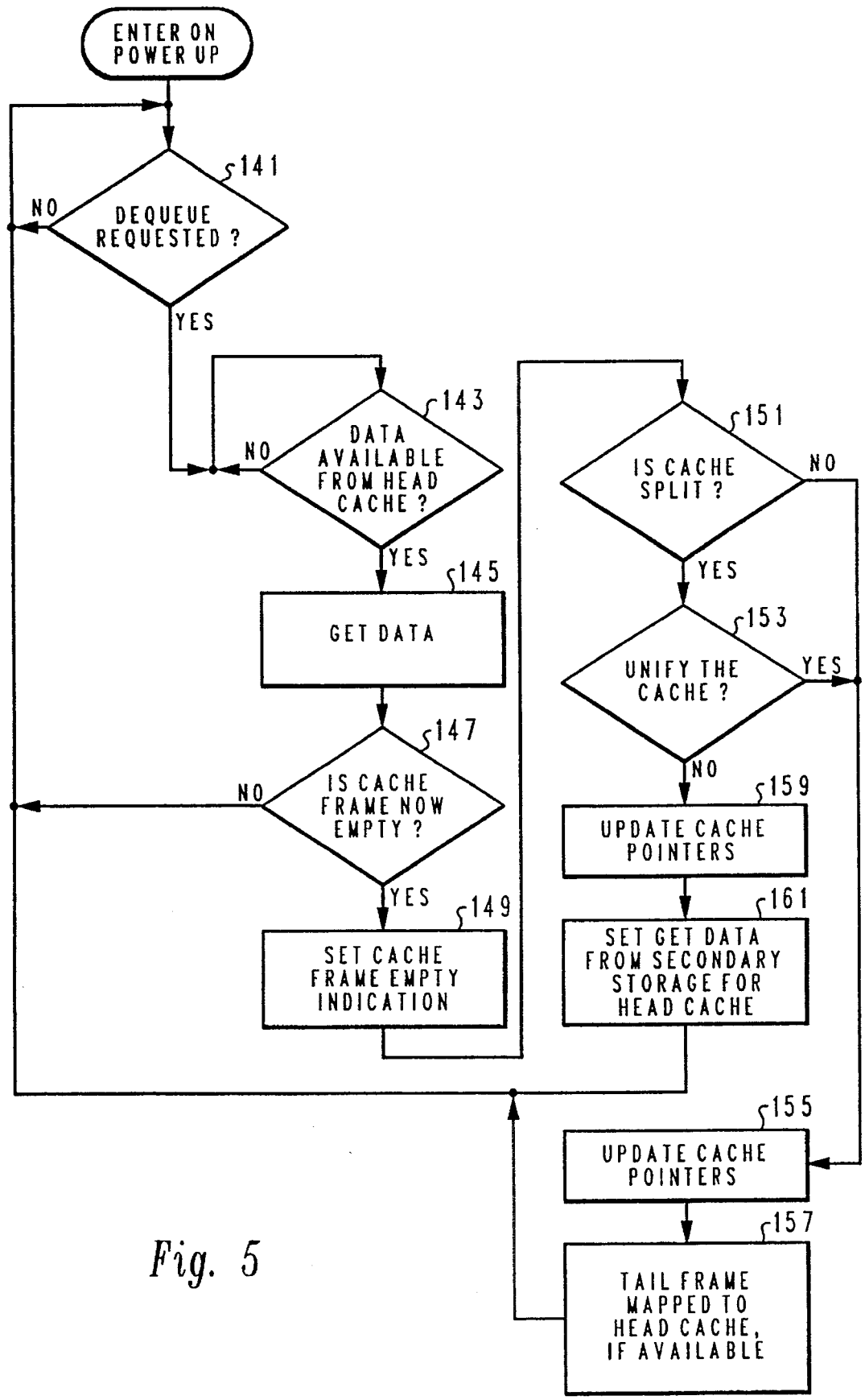
FIG. 5 is a high level logical flow chart of a process for dequeuing data from a FIFO queue.
Figure 6:
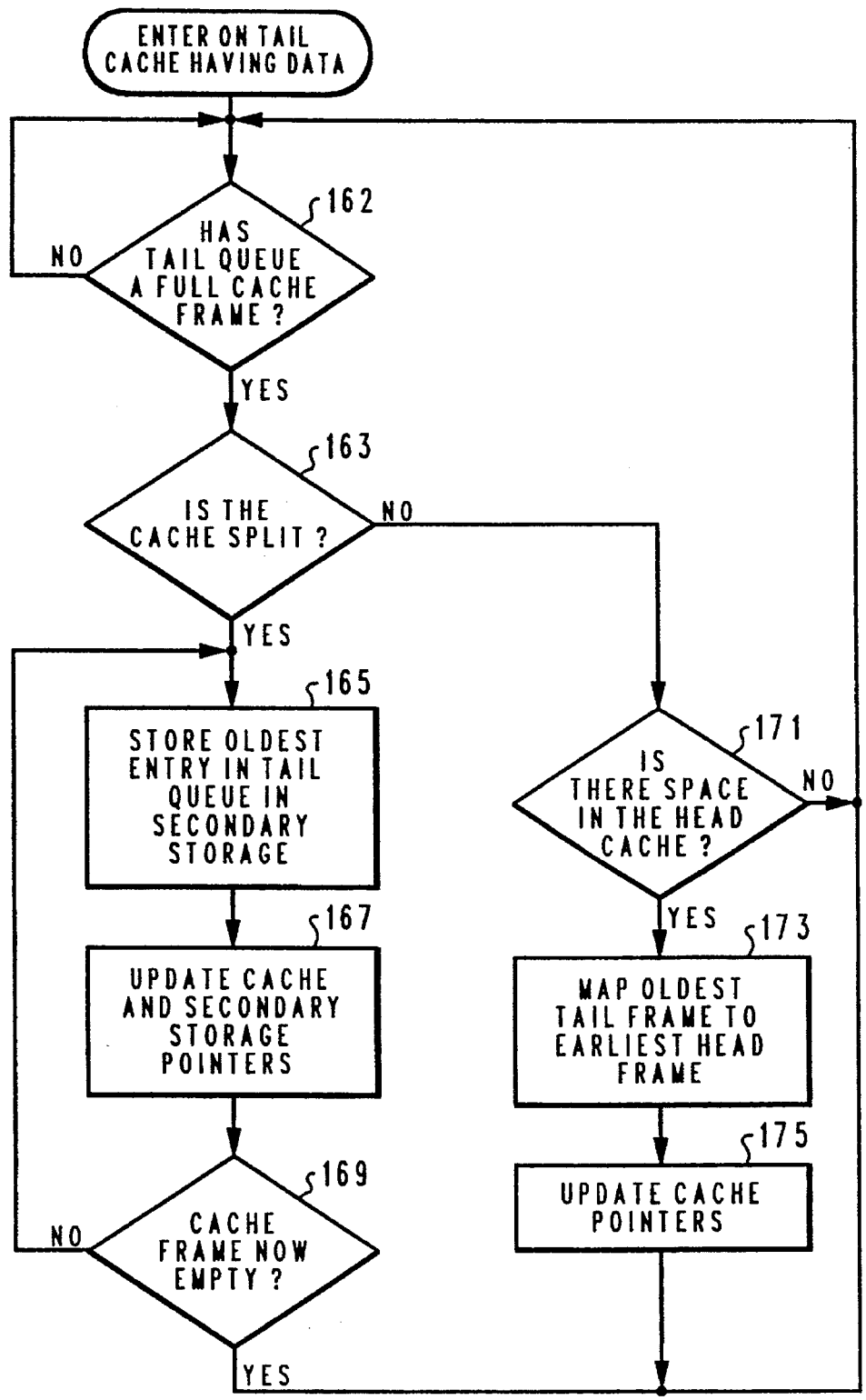
FIG. 6 is a high level logical flow chart of a process for swapping data from a FIFO queue to a backing store.
Figure 7:
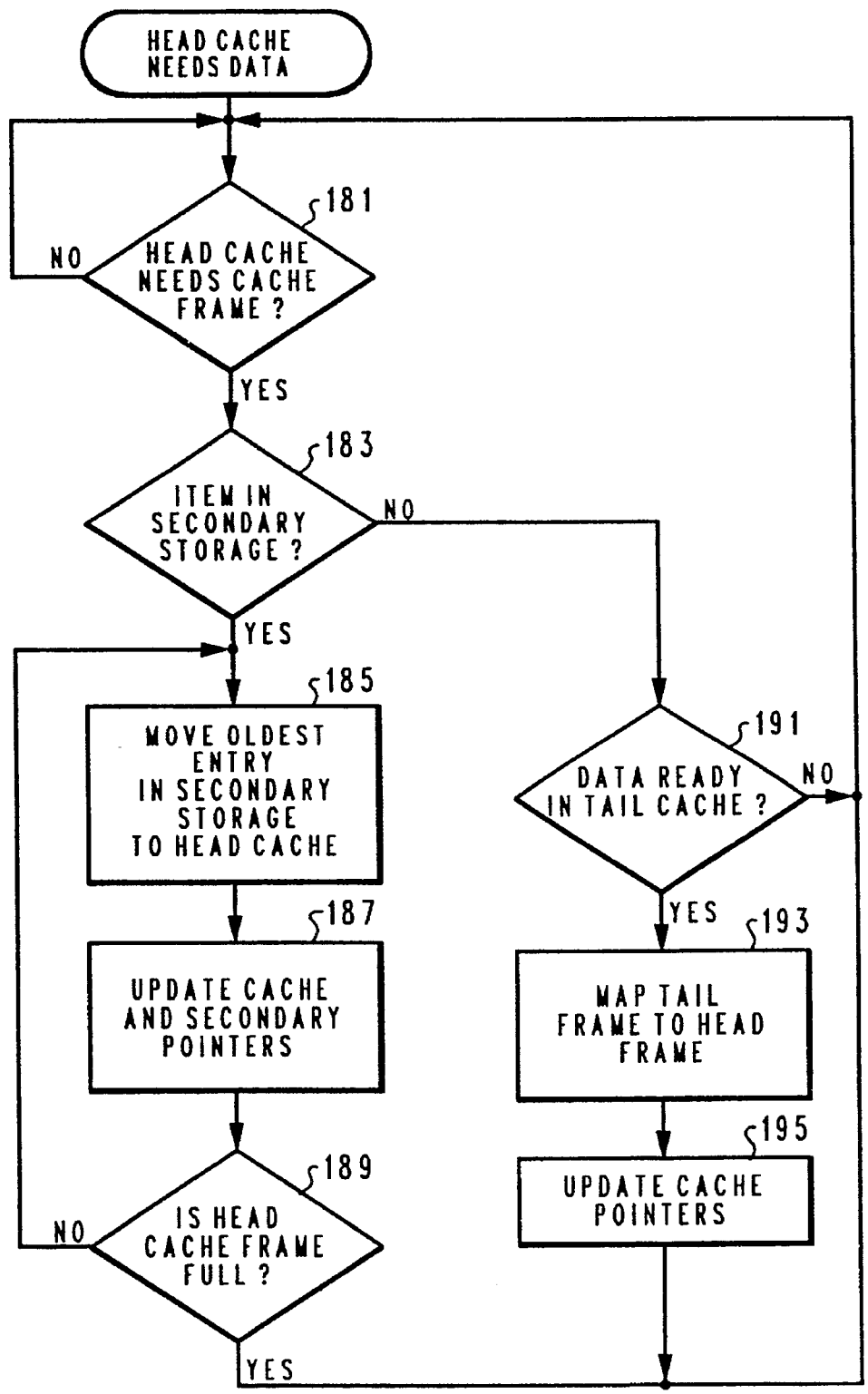
FIG. 7 is a high level logical flow chart of a process for swapping data from a backing store back into a FIFO queue.

FIGS. 4, 5, 6 and 7 all execute concurrently. The backing store operations reflected by FIGS. 6 and 7 are look ahead operations with the goal of keeping the cache head portion frames full and the cache tail portion frames empty. The frames which they operate on are intended to be of fixed size, though in some embodiments they may be subject to tuning in terms of that size and the total number of frames. The cache head portions and cache tail portions are also intended to have a fixed number of frames in memory device 35 even if no frames remain forever tied to either portion. However, this is a convenience and not a requirement of the invention. The number of frames assigned each portion need not be the same either.

FIG. 4 illustrates a process for controlling queuing of a data entry which is entered upon power up and continuously executed thereafter. At step 102 it is determined if an exogenous enqueue request has been received. If not, the process loops at step 102 (the NO branch) until an enqueue request is received. Next, at step 104 it is determined if there is space available to receive the item in the tail cache portion of the FIFO queue. In the example of FIG. 3 this would be one of frames 103, 105, 107, and 109 currently pointed to by the CTP, if it has space available. Until space is available at the tail of queue 101 the item cannot be queued. The process loops at step 104 until space does become available. Alternatively, or after expiration of a maximum time period, a failure may be indicated.

Once an item is available to be queued and space is available into which the item can be placed, step 106 provides for writing the data into a frame of the tail cache portion of FIFO queue 101 in memory device 35 identified by the CTP. Steps 108 and 110 reflect the fact that in the preferred embodiment frames in memory device 35 allow two entries. Where both entries are filled a code frame is full, which is detected by step 108. If the frame is full step 110 is then executed to set a frame full indicator, implying that the cache tail portion has data to be moved ahead in the FIFO queue. If the frame was not full, the NO branch from step 108 returns processing to step 102 for the next enqueue. Otherwise, after step 110, step 112 is executed to determine if the tail cache portion and the head cache portion of FIFO queue 101 are split. If not, the cache pointers are examined to determine if there is a need to split the tail and head cache portions. If the result of either inquiry is YES, step 116 is executed to update the cache pointers in accordance with an algorithm dictated by the split to indicate a new CTP. At step 118 the oldest items in the tail cache portion, indicated by the current state of the cache, the CTP and the NTP, are moved to a location in buffer 68.

Where the result to both steps 112 and 114 were both negative, step 120 follows step 114 to provide update of the cache pointers in accordance with an algorithm dictated by the absence of a split in the cached portion of the FIFO queue. Step 122 is not an actual process step but reflects that update of the cache pointers has the effect of moving items from the cache tail portion to the cache head portion. After steps 118 or 122 processing is returned to step 102 to await the enqueue instruction.

FIG. 5 illustrates a process for dequeuing items from a FIFO register. The process is entered at step 141 upon power up and loops at step 141 until a dequeue request is received. Next, at step 143 it is determined if an item is available the location in memory device 35 indicated by the CHP and HIP. If not, the process waits until an item becomes available at the indicated location. Once an item becomes available, step 145 is executed to get the item. Next, at step 147 it is determined if the item read from the cache frame emptied the frame. If the cache frame is not empty, processing returns to step 141 to await the next dequeue request. If the cache frame is empty, step 149 sets the cache frame empty indication (implying that the cache head portion needs data to stay full).

Following step 149, step 151 is executed to determine if the cache is split. If YES, step 153 is executed to determine if the cache should be unified. Following the NO result from step 151 or the YES result from step 153, step 155 provides for updating of cache pointers. Step 157 does not reflect actual processing, but reflects that the resetting of cache pointers has the effect of moving items (if any) from the cache tail portion to the cache head portion.

Where the cache is and must remain split, step 159 follows step 153 and provides for updating of the cache pointers in accordance with the algorithm dictated by the split cache (frames may no longer be moved between cache tail and cache head portions). Step 161 is then executed to fetch data from the secondary storage facility, usually main memory, into the cache head portion in memory device 35. After steps 157 or 161 processing is returned to step 141.

FIG. 6 is a logical flow chart of a process providing for backing store data flow. If the tail cache has data, step 162 is executed to determine if the full frame indication is on. If not the process waits until a full cache frame indication is set. Once the full cache frame indication is set, step 163 provides for determining if the cache is split. If it is, step 165 is executed to store the oldest entry in cache tail portion (item in location indicated by the current state of the cache, the CTP and the NTP). Next, in step 167 the cache and secondary storage pointers are updated. At step 169 it is determined in the cache frame was emptied by moving the item out to secondary storage. If not, processing returns to step 165 to handle the remaining item. If YES, processing returns to step 162.

Where the cache is not split, step 171 follows step 163. At step 171 it is determined if space is available in the cache head portion into which to move entries from the cache tail portion. If there is not the process loops back to step 162 and loops through that step and steps 163 and 171 until space does become available. Once space is available in the cache head portion, step 173 provides for mapping the oldest cache tail portion frame to the earliest cache head portion frame. Next, in step 175 this mapping is used in updating all cache pointers. After step 175 processing is returned to step 162.

FIG. 7 is a logical flow chart of a process for filling the cache head portion. The process is entered at step 181 where it is determined if the cache head portion has an empty cache frame to fill. If NO, processing loops at step 181 until an empty frame appears in the cache head portion. If YES, step 183 determines where to look to find a cache frame, that is secondary storage or in the cache tail portion. If an item is in the backing store, step 185 provides for moving the oldest item in the backing store to the cache head portion. Next, step 187 provides for updating the cache and backing store pointers. Then, in step 189 it is determined if the cache frame in the cache head portion has been filled. If NO, processing returns to step 185. If YES, processing returns to step 181.

If no items were available in the backing store, processing from step 183 advances to step 191 to determine if there are items ready for transfer from the cache tail portion. If NO, processing returns to step 181. If YES, step 193 maps the tail frame to the head frame. Step 195 is then executed using the map to update the cache pointers. Processing then returns to step 181.

The invention provides, with minimum processor intervention, a way to minimize the area of a VLSI chip used to support a FIFO queue of arbitrary size. Because it is absolutely predictable that the writes to a FIFO queue only occur at the tail and the reads only occur from the head, a very small cache can be made which will return optimal performance. For the hardware case where on-chip RAM is used with off-chip DRAM, a predictive flush and fill process assures that the cache is almost always ready to receive items or to deliver items. Nonetheless, the FIFO queue may be used as if it virtually unlimited capacity without performance degradation due to latency.

Adverse consequences for system performance are minimized by implementing the overflow aspects of the invention only on demand. If the FIFO queue remains within the size limitations of the on-chip RAM, the backing store is not used and items move directly from the cache tail portion to the cache head portion.

Extension of the foregoing process to software running on a cached memory processor involves the explicit management of the flushing and retrieval of the pages that the middle of the queue is stored on.

While the invention has been particularly shown and described with reference to a preferred embodiment, it will be understood by those skilled in the art that various changes in form and detail may be made therein without departing from the spirit and scope of the invention.

What is claimed is:

1. Apparatus for caching items for first-in, first-out queues on a data processing system, comprising:

a backing store for supporting a wrap around buffer;

a cache store having a plurality of frames;

means for dynamically assigning some but not all of the plurality of frames to a cache tail portion and at least some remaining frames of the plurality of frames to a cache head portion;

means responsive to an enqueue command for writing an item to a free frame assigned to the cache tail portion;

means responsive to a dequeue command for reading an item from an occupied frame assigned to the cache head portion;

means for moving an item from a frame assigned to the cache tail portion to a trailing location in the wrap around buffer; and means for moving an item from a leading location in the wrap around buffer to an unoccupied frame in the cache head portion.

2. Apparatus as claimed in claim 1, wherein the means for moving an item from a frame assigned to the cache tail portion operates responsive to a proportion of frames occupied in the cache store exceeding a threshold.

3. Apparatus as claimed in claim 2, wherein the means for dynamically assigning are responsive to the proportion of frames occupied in the cache store not exceeding a threshold for reassigning occupied frames from the cache tail portion directly to the cache head portion.

4. Apparatus as claimed in claim 3, wherein the means for dynamically assigning are responsive to the proportion of frames occupied in the cache store not exceeding a threshold for reassigning unoccupied frames from the cache head portion to the cache tail portion.

5. Apparatus as claimed in claim 4, and further comprising:

means for assigning pointers to selected ones of the plurality of frames in the cache store including, a current tail pointer for defining an entry frame in the cache tail portion, a tail intra frame pointer for defining which piece of the frame the next tail entry will be placed, a next tail pointer for defining the next frame to be used for the tail cache, a current head pointer to an output frame in the cache head portion for an oldest item in a first-in, first-out queue, a next head pointer to the location of the next frame with the next oldest item in the first in, first out queue, and a head intra frame pointer to the location within the frame where the next item to be removed is stored.

6. Apparatus as claimed in claim 5, wherein the means for moving items in frames assigned to the cache tail portion operates further responsive to a frame in the cache tail portion being full.

7. Apparatus as claimed in claim 6, wherein the means for moving an item from a leading location in the wrap around buffer to an unoccupied frame in the cache head portion operates responsive to occurrence of an open frame in the cache head portion.

8. Apparatus as claimed in claim 7, wherein the frames in the cache store hold two items.

9. A method of implementing a first-in, first-out queue on a segmented data storage system having a primary store and a backing store, comprising the steps performed by a computer of:

writing items to a tail portion of the primary store;

reading items from a head portion of the primary store;

responsive to occurrence of an item in the tail portion, determining if the primary store either currently stores items for the first-in, first-out queue or that the primary store is filled to a point indicating use of the backing store for storing items for the first-in, first-out queue;

if either determination of the preceding step is affirmative, moving the item from the tail portion to the backing store; and responsive to both determinations being negative and the head portion having space, moving the item from the tail portion to the head portion.

10. The method of claim 9, and further comprising:

responsive to an item being in the backing store and the head portion having space, moving the item from the backing store to the head portion.

11. The method of claim 10, wherein an item moved from the tail portion is the item longest in the tail portion.

12. The method of claim 11, wherein an item moved from the backing store is the item longest in the backing store.

13. The item of claim 12, wherein an item read from the head portion is the item longest in the head portion.

14. A data communications network comprising:

at least a first node;

a communication channel;

a data buffer connecting the node to the communication channel;

a segmented data store for the data buffer including a primary store and a backing store;

means for writing items to and reading items from the primary store;

means for aging the items; and means responsive to age of the items and excess demand for space to store the items in the primary store for swapping items in the middle by age of all the items between the primary store and the backing store.

15. The data communications network of claim 14, wherein the mean for swapping includes:

means for dividing space in the primary store into a head portion and a tail portion;

means for moving an oldest item from the tail portion into the backing store; and means for moving an oldest item from backing store into the head portion.

16. The data communications network of claim 15, and further comprising:

means responsive to lack of excess demand for space in the primary store for moving items from the tail portion directly into the head portion.

17. The data communications network of claim 16, and further comprising:

means for returning vacated space in the head portion to the tail portion.

18. A predictive item swapping system for a segmented memory, comprising:

the segmented memory having a cache and a backing store;

means for writing items to and reading items from the cache;

means for aging any item written into the cache; and means responsive to age of the items and excess demand for space in the cache for swapping items in the middle by age of all items written to but not yet read from the cache between the cache and the backing store.

19. A predictive item swapping system for a segmented memory as claimed in claim 18, wherein the mean for swapping includes:

means for dividing space in the cache into a head portion and a tail portion;

means for moving an oldest item from the tail portion into the backing store; and means for moving an oldest item from backing store into the head portion.

20. A predictive item swapping system for a segmented memory as claimed in claim 19, and further comprising:

means responsive to lack of excess demand for space in the cache for moving items from the tail portion directly into the head portion.

21. A predictive item swapping system for a segmented memory as claimed in claim 20, and further comprising:

means for returning vacated space in the head portion to the tail portion.

22. A method of replacing items in a cache from a wrap around buffer, the method comprising:

dividing the cache into a tail portion and a head portion;

beginning ageing of items upon first being written to the tail portion of the cache;

responsive to demand, reading an oldest item in the cache from the head portion;

responsive to an excess number of items in the cache, moving an oldest item from the tail portion to the wrap around buffer;

responsive to an opening in the head portion and presence of an item in the wrap around buffer, moving an oldest item in the wrap around buffer to the head portion;

responsive to an opening in the head portion and lack of any items in the wrap around buffer, moving the oldest item in the tail portion directly to the head portion.

* * * * *